Inventors
Ferdinand J. Mazur and
Lucien S. Ponce
By Nobbe & Swope
Attorneys

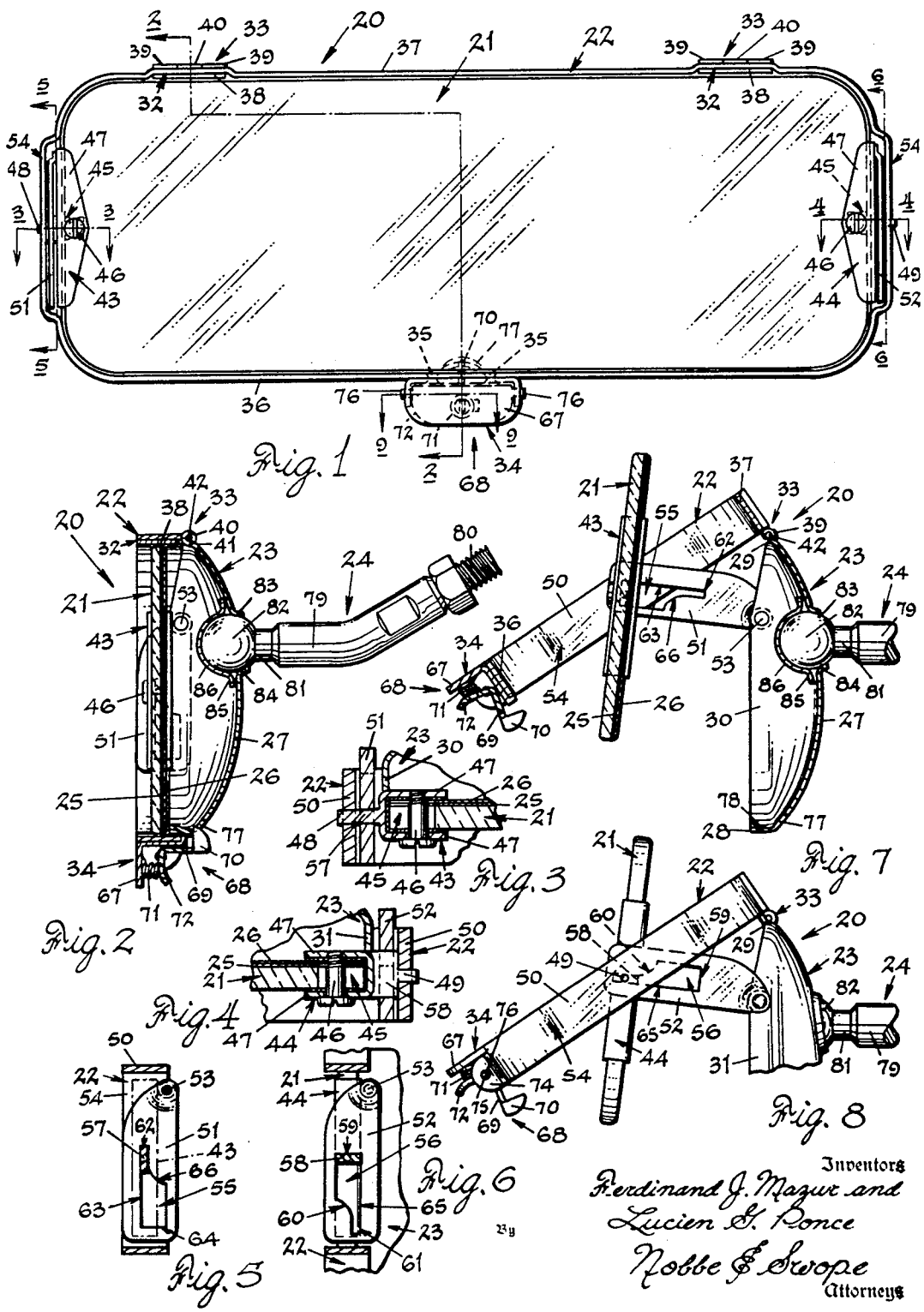

May 22, 1956  F. J. MAZUR ET AL  2,746,353
REVERSIBLE REARVIEW MIRROR
Filed June 29, 1950  3 Sheets-Sheet 3
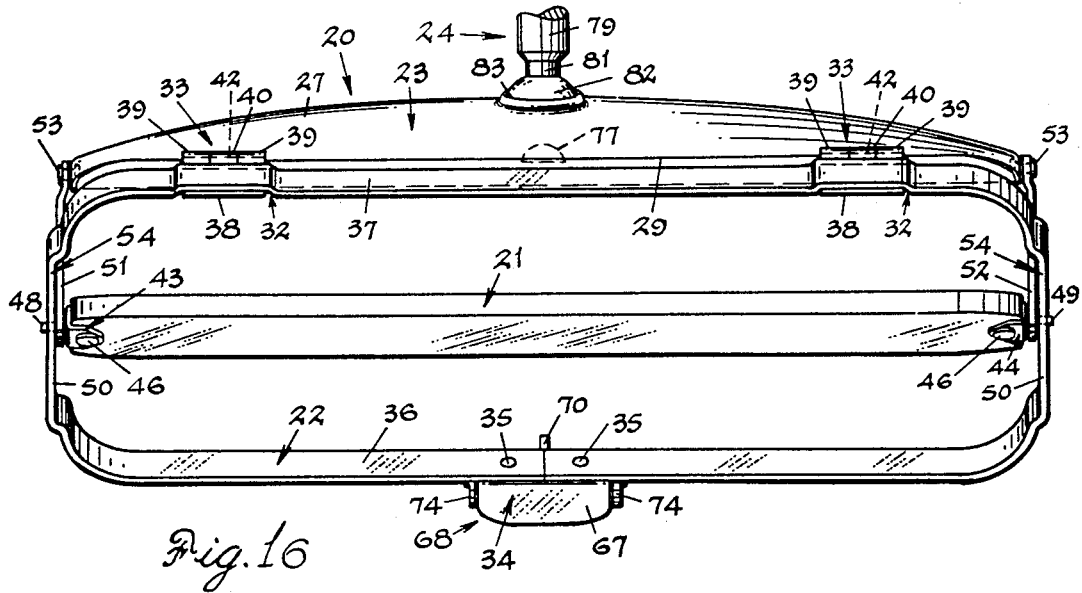
Fig. 16
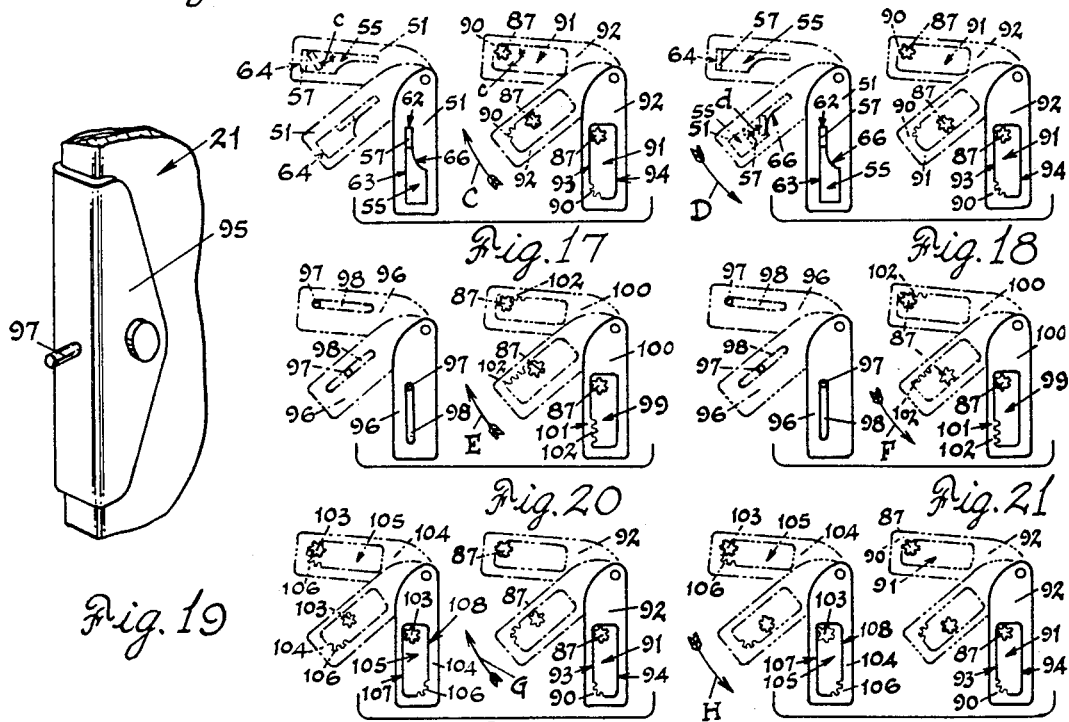
Fig. 17  Fig. 18
Fig. 19  Fig. 20  Fig. 21
Fig. 22  Fig. 23
Inventors
Ferdinand J. Mazur and
Lucien G. Ponce
Nobbe & Swope
Attorneys

United States Patent Office 2,746,353
Patented May 22, 1956

2,746,353

REVERSIBLE REARVIEW MIRROR

Ferdinand J. Mazur, Natrona Heights, Pa., and Lucien G. Ponce, Weirton, W. Va., assignors to Libbey-Owens-Ford Glass Company, Toledo, Ohio, a corporation of Ohio Application June 29, 1950, Serial No. 171,052

13 Claims. (Cl. 88—77)

The present invention relates broadly to rear view mirrors such as are used in automobiles and the like and more particularly to a reversible rear view mirror adapted for day and night driving.

Generally stated, this invention is concerned with that type of rear view mirror comprising a mirror element having two surfaces of different reflectivities and being reversible so that either reflective surface may be brought into operative viewing position by the driver of the vehicle, one reflective surface being preferably in the form of a mirror for use in day driving and the other providing a mirror for night driving which will reduce the brilliance of the reflected headlights of an automobile approaching from the rear.

It is an aim of the invention to provide a rear view mirror of the above type embodying mounting means therefor of a novel and improved character which will enable the driver of the automobile or the like to reverse the mirror in a rapid, efficient manner and with a minimum of care and attention on his part and without requiring any subsequent adjustment.

Another object of the invention is the provision of such a rear view mirror embodying a supporting case, the front of which is open, and a mirror element associated with the case and adapted to close the front thereof when in normal operative position and being rotatable with respect thereto whereby it can be readily reversed to selectively bring either of the reflecting surfaces into operative position with respect to the driver's eyes depending upon whether the mirror is to be used for day or night driving.

Another object of the invention is the provision of a rear view mirror assembly embodying a supporting case upon which the mirror element is hingedly mounted for bodily rotatable movement, the several parts of the assembly being so associated with one another as to provide a simple, compact arrangement which may be easily actuated by the driver of the vehicle whereby either the day driving or night driving mirror surface can be selectively brought and retained in the line of the driver's vision without requiring his visual attention or otherwise diverting his attention from the road.

A further object of the invention is the provision of a rear view mirror assembly embodying novel actuating means by which the reversal of the mirror element will be automatically effected by a simple forward and rearward motion imparted thereto by the driver and which obviates any actual rotation of the mirror unit by the driver or further adjustment thereof.

A further object of the invention is the provision of a rear view mirror assembly of the above character wherein the supporting case which carries the mirror element for both bodily and rotatable movement acts as a shield for the out-of-vision mirror surface to protect the same from the lights of oncoming vehicles and thereby prevent incidental reflections in the windshield of the vehicle created by oncoming traffic.

Other objects and advantages of the invention will become more apparent during the course of the following description when taken in connection with the accompanying drawings.

In the drawings, wherein like numerals are employed to designate like parts throughout the same:

Fig. 1 is a front elevation of a reversible rear view mirror constructed in accordance with the invention;

Fig. 2 is a vertical transverse section taken substantially on line 2—2 of Fig. 1;

Fig. 3 is a horizontal detail section taken substantially on line 3—3 of Fig. 1 through one end of the mirror mounting;

Fig. 4 is a similar horizontal section taken substantially on line 4—4 of Fig. 1 through the opposite end of the mounting;

Fig. 5 is a vertical section taken substantially on line 5—5 of Fig. 1 showing one of the actuating arms for rotating the mirror element;

Fig. 6 is a vertical section taken substantially on line 6—6 of Fig. 1 showing the opposite mirror actuating arm;

Fig. 7 is a vertical sectional view similar to Fig. 2 but showing the several parts thereof in open position during reversal of the mirror element;

Fig. 8 is an end elevation showing the several parts in positions similar to those of Fig. 7;

Fig. 16 is a top view of the mirror, with the parts thereof located in their outermost positions;

Figs. 17 and 18 are graphic views of the modified actuating arm arrangement as shown in Figs. 13 and 14;

Fig. 19 is a fragmentary perspective view of a modified form of mirror supporting member;

Figs. 20 and 21 are graphic views of another modified form of actuating means including the supporting member shown in Fig. 19 and a different type of actuating arm; and Figs. 22 and 23 are graphic views of a further modified construction wherein the mirror actuating arms and actuator members are both of the form shown in Fig. 13.

Figures 10, 11:
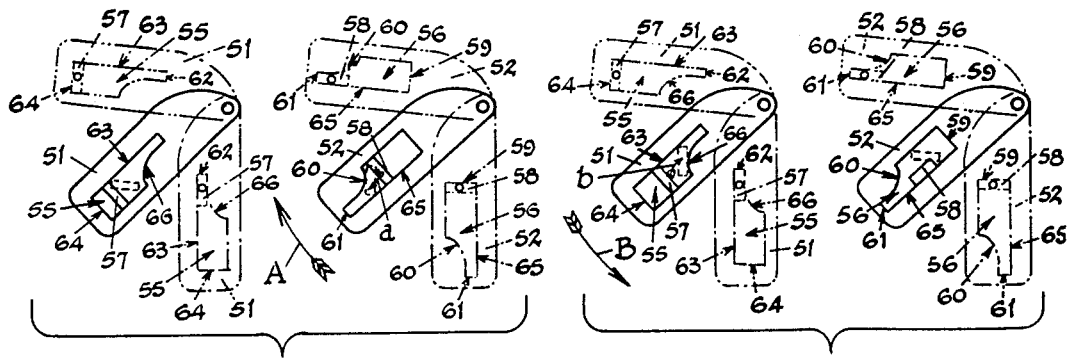
Figs. 10 and 11 are graphic views of the acuating arms illustrating diagrammatically the relation of their movements to effect rotation of the mirror element.

Referring now more particularly to the drawings, there is illustrated in Fig. 1 a reversible rear view mirror designated in its entirety by the numeral 20 and constructed in accordance with the basic principles of this invention. The rear view mirror 20 comprises generally a mirror element 21 which is rotatably carried in a swingable frame 22 hinged to a supporting case 23. A mounting indicated by the numeral 24 is provided by which the mirror is attached to the framework of an automobile.

The mirror element 21, as here shown, is of substantially rectangular form and may be of glass, plastic, or other suitable transparent and/or opaque material of suitable thickness. Preferably, the mirror element is of transparent glass and is provided upon one surface thereof with reflecting coatings 25 and 26, which may be applied or obtained by any suitable or preferred method; either as shown on one side of the mirror element; or on opposite sides thereof, or by applying a reflecting film to one surface and employing the natural low reflectivity of the glass as the second reflecting surface. These reflecting surfaces, however obtained, are provided to secure alternately and at will a high reflectivity for daytime driving and a lower reflectivity more desired for nighttime driving.

More particularly, the mirror element 21 may carry a film of high reflecting power to provide the mirror surface 25 and a film having a lower reflecting power to furnish the mirror surface 26. In the preferred form, the high reflecting mirror film 25 is in contact with a transparent mirror element 21 and the other mirror film 26 superimposed upon the outer surface of film 25. A useful construction may, however, also be formed with the mirror film 26 in contact with element 21 and with the higher reflecting film 25 superimposed thereon.

The mirror element 21 is carried for rotatable movement in the frame 22 which is of corresponding rectangular outline and hingably associated with the supporting case 23.

The case 23 is also substantially rectangular in outline and complementary to the mirror element 21 and frame 22. The case comprises a back wall 27 that is arcuately curved through both of its axes, as shown in Figs. 2 and 16, said wall being shaped to provide a forwardly directed flange 28 along the bottom thereof and forwardly directed flanges 30 and 31 at its opposite ends. Thus the case 23 is of so-called "dished" formation having a bottom wall 28 and end walls 30 and 31, which merge at their upper ends into the upper marginal edge 29 of the back wall 27.

The frame 22 is hinged to the case 23 along its upper marginal edge 29 by means of the hinges generally indicated at 33, whereby the frame can be swung forwardly and upwardly away from the case or positioned so as to encircle the walls 28, 30 and 31 thereof when the mirror element 21 is located in viewing position.

The frame 22 may be formed or shaped from suitable band or metal tape bent into substantially rectangular form and having the ends thereof secured in abutting relation by means of an angle plate 34 to which said ends are anchored as by welding or as herein shown by rivets 35 or the like. Preferably, the secured ends are arranged in that part of the frame which forms the bottom wall 36 thereof so that the angle plate 34 may be located intermediate the ends of the frame to serve as a finger grip as will be more fully hereinafter described.

The upper wall 37 of the frame 22 is provided adjacent its opposite ends with depressions 32 in which are secured plates 38 having pairs of journal portions 39 that form a part of the hinges 33. Each pair of journals 39 receives a central journal 40 therebetween, the journal 40 being formed by a tongue 41 extending outwardly from the upper marginal edge 29 of the supporting case 23. Pintles 42 pass through the journals 39 and 40 and thus swingably interconnect the frame to the supporting case so that it can be swung to a closed position, as shown in Fig. 2, to locate the mirror element 21 in viewing position or as shown in either of Figs. 7 or 8 to an open position wherein the mirror element is located for rotation and reversal.

The mirror element 21 is rotatably carried in the frame 22 by means of the substantially U-shaped bracket members 43 and 44 that fit over the opposite marginal end portions of the mirror element. As shown, the mirror element 21 has notches 45 formed in its end edges along its longitudinal axis and the bracket members are provided with screws or rivets 46 extending through said notches and adequately tightened or otherwise secured in the legs 47 of the U-shaped brackets to clamp the mirror element bodily within the same. While the bracket members 43 and 44 are herein shown as being fixedly secured to the mirror element 21 by the screws 46, this fixed relation can be equally well secured by use of suitable adhesives, thereby eliminating any necessity for notching of the glass except, however, where the same may be required for the purpose of centering said brackets with reference to the mirror element.

The brackets 43 and 44 are provided with horizontal supporting shafts or trunnions 48 and 49 respectively that are suitably journaled in openings provided in the end walls 50 of the frame 22. Consequently, when the frame is swung outwardly upon hinges 33 relative to the supporting case 23, the mirror element 21 is freely rotatable upon the shafts 48 and 49 to effect the reversal thereof and to selectively bring either of the reflecting surfaces 25 or 26 into operative viewing position. However, in accordance with the present invention, the outward movement of the frame 22 is adapted to initiate partial automatic rotation of the mirror element 21, and subsequent inward movement of the frame completes this rotation to reverse the mirror element.

In the preferred embodiment of the invention, this automatic rotation of the mirror element is accomplished by means of a pair of actuating arms 51 and 52 pivotally supported at their inner ends by rivet pins 53 on the end walls 30 and 31 respectively of the supporting case 23. To accommodate the arms 51 and 52 between the ends 50 of the frame 22 and the brackets 43 and 44, The said ends are shaped to form recesses 54 in which the arms will be positioned in close nesting relation to the adjoining members. The arms 51 and 52 are carried at their outer ends on the shafts 48 and 49, which support the mirror element 21 within the frame 22, so as to be movable therewith. More specifically, the pivots afforded by the rivet pins 53 are located with reference to the hinges 33 to produce a radial motion of the arms 51 and 52 through arcs which are eccentric to the arcs described by the shafts 48 and 49 when carried radially by the frame 22. The actuating arms 51 and 52 and shafts 48 and 49 thus actually slide or reciprocate relative to one another, and means is herein provided for utilizing this reciprocal movement to carry out rotation of the mirror element.

The actuating arms 51 and 52 are provided with suitably formed cam slots 55 and 56 through which the shafts 48 and 49 project and these shafts have specially shaped actuator portions in the form of slide bars 57 and 58 that are influenced by the outline of these slots whereby swinging movement of the arms will cause the shafts and the mirror element carried thereon to be rotated. Thus, the cam-like slots 55 and 56 actively engage slide bars 57 and 58, respectively, that are formed as a part of or from which the shafts 48 and 49 project from the brackets 43 and 44 respectively. Preferably, the cam outline of the slots 55 and 56 is determined by the relation of the slide bars 57 and 58 therewith, and, as will be noted in Figs. 1, 5 and 6, these bars are arranged as a part of their respective brackets so as to be located substantially at right angles to each other.

As shown in Figs. 1, 3 and 5, the slide bar 57 is formed on the bracket 43 to extend generally parallel with the bracket and the mirror element, and concentric with its axis and with the shaft 48 projecting therefrom. On the other hand, the slide bar 58, as shown in Figs. 4 and 6, is formed on the bracket 44 concentric with the axis of the mirror element 21 and shaft 49 but substantially at right angles to the bracket 43 and the slide bar 57. Thus, the cam-like slots 55 and 56 in the actuating arms 51 and 52 are designed to have inoperative areas and operative areas that control the action of the slide bars 57 and 58 and consequently the rotation of the mirror element. The slots 55 and 56 in the arms 51 and 52 may also be of a determinable length to control the extent of swinging motion of the frame 22. The inoperative and operative areas of each slot are so disposed within this determinable length that the slide bars 57 and 58 will be carried or acted upon to cause their rotation during the outward and inward swinging movements of the frame.

The cam-like slots 55 and 56 are of a similar pattern but are reversely arranged in their respective actuating arms, as clearly shown in Figs. 5 and 6, to initiate rotation of the mirror element in sequential and inverse order; one cam slot being effective during outward movement of the frame, and the other cam slot becoming effective during the subsequent inward movement thereof. The slot in either arm may be selected to initiate the rotary motion and, by way of example, the slot 56 in arm 52 will be so described. As will be noted in Fig. 6, the said slot is thus formed to receive the slide bar 58 at the inner end 59 thereof, which end is of sufficient width to accommodate the width of said bar. This width is maintained through substantially one-half of the length of the slot and is then gradually reduced to the thickness of the slide bar by the shaping of the slot along its upper edge as at 60 to provide the operative area. This operative area or cam surface 60 is located so as to turn the slide bar 58 through 90 degrees as the arm 52 is moving forwardly and upwardly and so that said bar will be carried endwise into the narrow end 61 of the slot. While this sequence of operation is occurring, the slide bar 57 is moving from the narrow end area 62 of slot 55, as shown in Fig. 5, along the straight upper edge 63 of the slot 55. As the slide bar 58 is turned to enter the narrow end 61 of slot 56, the slide bar 57 will in like manner be turned in its slot 55. To accommodate the width of the bar 57 as it is turned, the slot 55 is widened accordingly as at 64 so that as the slide bar 58 reaches the narrow end 61 of slot 58, the slide bar 57 will arrive at the wide end 64 of slot 55.

The resultant effect created by the sliding and turning action of the slide bars 57 and 58 in the slots 55 and 56 of actuating arms 51 and 52, respectively, is best illustrated in Figs. 10 and 11 wherein the relative movements of the several parts during the outward movement of the frame 22 is diagrammatically shown in Fig. 10 and the corresponding movements of the parts are shown during inward movement of the frame in Fig. 11, the actuating arm 51 being shown at the left in each of the figures and the arm 52 at the right.

Referring particularly to Fig. 10, the actuating arms 51 and 52 are each shown in broken lines in their idle or non-actuating positions and in full lines in actuating position. Now, as the frame 22 is moved outwardly and upwardly, as indicated by the letter A, from the position shown in Fig. 2 toward the position illustrated in Fig. 7, the arms 51 and 52 are likewise swung outwardly and upwardly to and through the position shown in full lines to the upper position indicated in broken lines. During this concurrent motion, the mirror element 21 is carried in an arc which is concentric to the hinges 33, while the arms 51 and 52 are swung in an eccentric arc to move reciprocally relative to the surfaces of the slide bars 57 and 58. However, since there will also be a lifting influence exerted, the slide bar 57 will follow the straight upper surface 63 from the narrow end 62 of cam slot 55 while the slide bar 58 will be brought, as shown in full line, into engagement with the cam surface 60 of slot 56 in arm 52. This engagement produces, upon continued movement of slide bar 58, a rotating action which, as indicated by the arrow denoted by the letter a, is imparted thereto and as a consequence of which said slide bar is turned substantially a quarter revolution and the mirror element 21 and slide bar 57 are likewise turned. At the upper limit of the outward motion of frame 22 it will be seen that the slide bars 58 and 57 will have reached the narrow end 61 of the slot 56 and the wide end 64 of the slot 55 respectively, and have actually turned to positions at right angles to their starting positions.

During the return downward and inward movement of the frame 22, as indicated by the arrow B in Fig. 11, the actuating arms 51 and 52 are carried from the upper position indicated in broken lines through the positions indicated by full lines and returned to the broken line positions in which the arms are located substantially as in the starting position of Fig. 10. Now, the downward influence imposed by the frame on the mirror element through the shafts 48 and 49 directs the slide bars 57 and 58 along the bottom surfaces of the cam slots 55 and 56 so that the slide bar 58 traverses the straight surface 65 of cam slot 56 (as shown in full lines) while the slide bar 57 is carried into engagement with the cam surface 66 of cam slot 55 and consequently is caused to rotate as shown by the arrow indicated by the letter b.

This continued rotation completes the half rotation of the mirror element 21 so that when it is again located in viewing position, the reflecting surfaces thereof will have been reversed. The slide bar 58 will now be positioned to enter the wide end 59 of the slot 56, while the slide bar 57 will correspondingly be positioned to enter the narrow end 62 of the slot 55, since both slide bars will have turned a further quarter rotation. The forward and rearward swinging movements of the frame 22 may be performed in a rapid manner by the driver of the vehicle to select the desired reflecting mirror surface. This can be accomplished in an efficient convenient manner with a minimum of care and attention on his part and without requiring any subsequent adjustment of the mirror since the same area of the rear view scene is maintained in either of the two reflective surfaces.

Figures 9, 15:
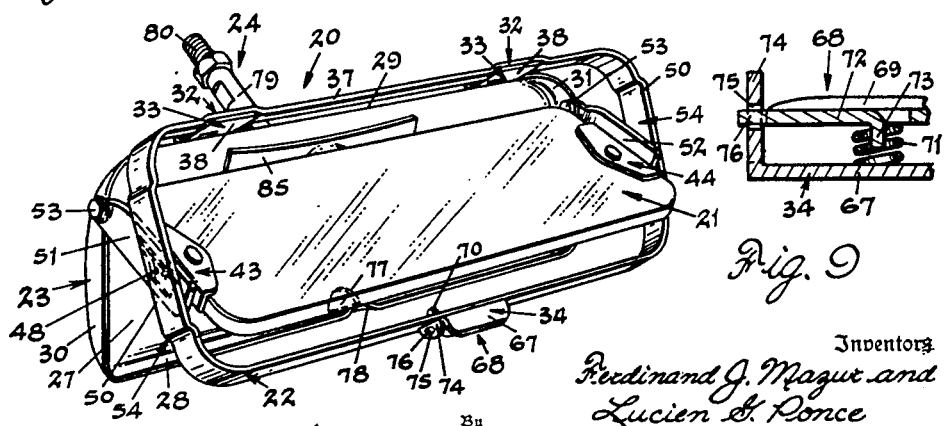
Fig. 9 is a detail sectional view taken substantially on line 9—9 of Fig. 1.
Fig. 15 is a perspective view of the mirror, with the parts positioned as shown in Figs. 13 and 14.

The frame 22 is manually operated by means of the angle plate 34 which, as previously pointed out, serves as a finger grip. More particularly, the depending leg 67 of the angle plate 34 is engageable to pull the frame 22 from its closed position with reference to the supporting case 23 and to release a latch which secures said frame in its closed position. This latch, generally indicated by the numeral 68 (Fig. 9) is embodied in a pivotally supported angle plate 69 having an upwardly directed latch finger 70, while a coil spring 71 is arranged between the depending leg 72 of the angle plate 69 and the corresponding leg 67 of the angle plate 34 and is carried on a tab 73 struck from the leg 72. The angle plate 69 is pivotally supported between bent ears 74 extending downwardly at the ends of plate 34, said ears being provided with openings 75 for receiving tabs 76 forming end parts of the depending leg 72 of angle plate 69.

When in latched or closed position as shown in Fig. 2, the latch finger 70 engages the edge of an opening 77 or a notch formed in the back wall 27 of the supporting case 23. Preferably, the lower wall 28 of the case is provided with a struck-up surface area 78 (Fig. 15) and the end of the latch finger 70 is adapted to ride downwardly on the surface 78 and, under the influence of the spring 71 to snap into the opening 77 or notch to secure the frame 22 against the supporting case 23.

To operate the latch 68, preparatory to swinging the frame 22 outwardly and upwardly, the depending legs 67 and 72 are gripped and squeezed together to compress the coil spring 71 and remove the latch finger 70 from the opening 77. Upon subsequent return movement of the frame, the leg 72 may be slightly released so that the latch finger 70 will be immediately snapped into latching engagement with said opening 77.

Another feature of the rear view mirror herein provided is that the rear wall 27 of the case 23 acts as a cover for the mirror surface facing said rear wall to shield the same from the headlights of oncoming vehicles and thereby prevent incidental reflections in the windshield of the vehicle created by oncoming traffic. Thus, the out-of-vision reflecting surface is normally in a position to receive light rays that may originate in approaching car lights, sunlight, and reflections from either source. These light rays can and will, unless the mirror is shielded therefrom, be reflected back toward the windshield of the vehicle and create disturbing sources of conflicting light or areas of scattered light therefrom which may materially interfere with driving safety and comfort. The rear wall 27 of the case in serving as a cover for the adjacent reflecting surface of the mirror prevents such incidental reflections.

This is particularly important where the rear view mirror is located in a position beneath the forward wall of the top of the vehicle and especially in the newer body styles wherein the center windshield post is dispensed with to achieve an unobstructed one-piece windshield. When either of the reflective surfaces 25 or 26 of the mirror element is thus located out of viewing position, it will be suitably shielded in the invention by the supporting case 23 from reflecting undesirable light and while still positioning the operatively disposed reflecting surface within the driver's range of vision.

The rear view mirror assembly is preferably supported within an automobile by the mounting 24 so that it may be bodily adjusted to any desired angular position to accommodate persons of different height and seating position. One such adjustable mounting comprises an arm 79 having a threaded end portion 80 by which it is attached to the vehicle frame. Opposite the threaded portion, the arm 79 is provided with a reduced shank 81 which terminates in a ball end 82 as shown in Fig. 2. The ball 82 projects through an opening 83 in the rear wall 27 of the supporting case 23 and is mounted in a spherical bearing or seat 84 formed in the wall 27 concentrically with the opening 83. The ball is retained in this seat by a spring metal strap 85 suitably secured to the wall 27 and having a centrally formed bearing surface 86 conforming to and engaging the ball 82. The bearing surfaces 84 and 86 of the wall 27 and metal strap 85 respectively, coact to grip the ball 82 of the mounting arm 79 with sufficient force to maintain the mirror assembly stationary except when it is desired or necessary to adjust the same bodily to accommodate the driver.

The construction of the actuating arms 51 and 52 and actuator members 57 and 58 may be modified, if desired, without departing from the spirit of the invention, by the substitution of a gear for the slide bar at one end of the mirror element as shown in Figs. 17 and 18. Or, as illustrated in Figs. 20 and 21, a single gear at one end of the mirror element may be so associated with its actuating arm as to effect a complete reversal of the mirror element, while in a further modified form, as in Figs. 22 and 23, actuator members in the form of gears may be employed at opposite ends of the mirror element and associated with the actuating arms so that each gear will effect a partial rotation of the mirror element in substantially the same manner as the slide bars 57 and 58.

With reference particularly to Figs. 12, 13, 14, 17 and 18, the rotation of the mirror element at one end thereof is effected by a gear 87 and at its opposite end by the slide bar 57. The gear 87 cooperates with the slide bar 57 to cause reversal of the mirror element in substantially the same manner as slide plate 58. As will be noted in Fig. 12, the gear or pinion 87 is fixed to or formed integrally with a shaft 88 that projects from the bracket 89 and serves to rotatably support the mirror element within the frame. The gear 87 coacts with a special type of gear rack 90 forming a portion of the slot 91 of a correspondingly modified actuating arm 92.

The actuating arm 92 is pivotally carried by the supporting case 23 on the pin 53, in a manner similar to arm 52 previously described, and will be swung about the axis of the pin 53 upon swinging of the frame 22. Since the gear 87 will be moved along the straight edge portion 93 of the slot 91, there will be no rotation of the mirror element as the actuating arm swings forwardly and upwardly as indicated by the arrow C in Fig. 17, especially since the slide bar 57 is simultaneously moving along the straight edge portion 63 of the cam slot 55 in actuating arm 51. However, when the frame 22 approaches the terminus of its outward swinging motion, and the arms 51 and 92 are positioned as shown in their uppermost broken line positions, the gear 87 will engage the teeth of the gear rack 90 and consequently rotate therewith as indicated by the arrow c and the quarter rotation of the slide bar 57.

During the downward and inward movement of the frame 22, as indicated by the arrow denoted D in Fig. 18, the associated parts will move progressively from the upper position shown to the intermediate broken line position and thence to the full line position. As the slide bar 57 engages the cam surface 66 of the slot 55 in arm 51, it will be turned so as to complete the desired rotation of the mirror element to reverse the reflective surfaces thereof as indicated by the arrow d. While the slide bar 57 is being carried toward and into engagement with the cam surface 66, the gear 87 is moving in an idle status along the straight edge portion 94 of slot 91 and will be carried therealong until it arrives at the starting position indicated by the arms in full lines in Figs. 17 and 18.

As shown in Figs. 20 and 21, the gear 87 may be employed to produce the entire turning operation of the mirror element. In order to impose this function on the gear, a modified supporting bracket 95 for the mirror element is used in place of the bracket 43 and an actuating arm 96 in place of the arm 51. The modified form of bracket is shown in Fig. 19 as being provided with an axially disposed shaft 97. This shaft is located in a slot 98 in the arm 96 and its end is journaled in the end wall of the frame 22 similarly to shaft 48. The slot 99 of the related actuating arm 100 is also modified by the provision of a gear sector 101 (Fig. 20) which has a sufficient number of teeth 102 to move the gear 87 through one-half revolution when in meshing engagement therewith. Accordingly, the arms 96 and 100 will be swung by the frame 22 from their normal full line positions, through the intermediate broken line positions to their upper positions, also shown in broken lines, while moving in the direction of the arrow E. During this upper movement of the frame, the shaft 97 will traverse the slot 98 of arm 96 to its outer extremity and the gear 87 will be carried into engagement with the teeth 102 of gear sector 101. Since swinging of the frame 22 initiates first a lifting action of the actuating arms and later a lowering action, as previously pointed out as said frame 22 is moved to and from the outer terminus of its movement, the gear 87 will be moved along the gear sector 101 and caused to rotate through a half rotation. Upon separation from the teeth 102, the gear 87 will be carried along the straight line confines of the slot 99 during movement of the arm 100 in the direction of the arrow F (Fig. 21) until it has reached its original starting position at which time the frame 22 is again in closed position with respect to the supporting case 23 and the desired mirror surface is in the field of view of the driver.

Figures 12, 13, 14:
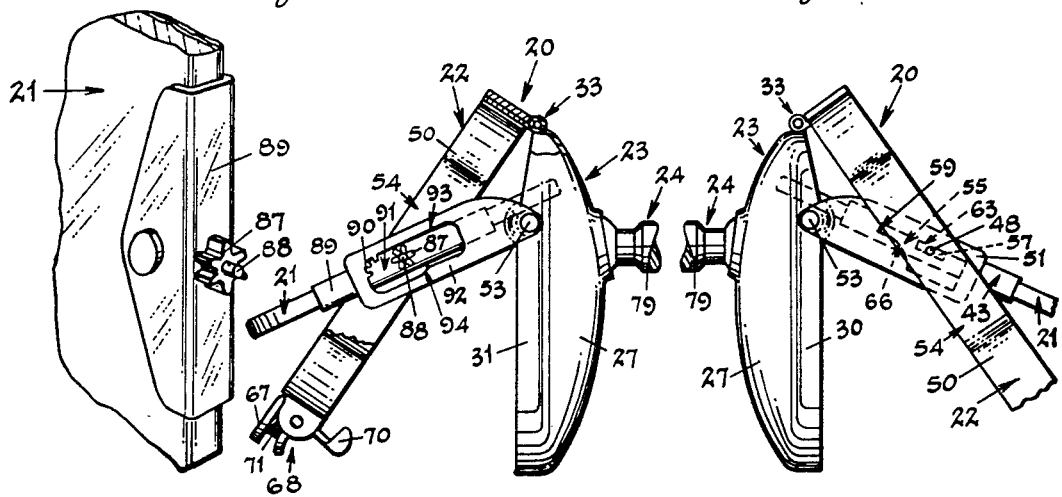
Fig. 12 is a fragmentary perspective view of the support for the mirror element with a modified form of actuator member.
Fig. 13 is an end view of the mirror, with the parts thereof partially moved to their outward position and wherein the modified actuator member and a modified actuating arm are employed.
Fig. 14 is a similar view of the opposite end of the mirror with the parts located as shown in Fig. 13.

In Figs. 22 and 23 there is shown a further modified construction wherein supporting brackets 85, such as shown in Fig. 12, are employed at both ends of the mirror element. Each of these brackets carries a gear 103 similar to gear 87, and a similar short shaft for rotatively supporting the mirror element in the frame 22. As herein provided, the arm 104 has a substantially rectangular slot 105 having a curved gear sector 106 in its front lower corner that is located in opposition to the gear sector 90 in the actuating arm 92. As will be noted, the slot 105 has straight edge surfaces 107 and 108 that are inversely located with respect to the corresponding straight edge surfaces 93 and 94 of slot 91 in arm 92.

Thus, during the outward and upward swinging movement of the frame 22, the arms 92 and 104 will cause the gears 87 and 103 to travel along their related straight edge surfaces 93 and 107 while said arms are moving in the direction of the arrow G and until their upper position is reached and the gear 87 meshes with and is rotated by the gear sector 90 to produce partial rotation of the mirror element 21 within the frame 22. At this time, the gear 103 will not have engaged the gear sector 106. However, as the arms are swung downwardly from their upper broken line positions and in the direction of the arrow H in Fig. 23, the gear 87 will move out of engagement with the gear sector 90 while the gear 103 will mesh with the gear sector 106 to effect continued rotation of the mirror element to cause the reversal thereof.

In the operation of the mirror to selectively obtain the desired degree of reflectivity from the mirror element 21, it is again emphasized that the necessary extent of swinging motion of the frame 22 is relatively short and is carried out by simply quickly lifting and lowering the frame. To reverse the mirror element, the driver merely grasps the finger grip 68 to swing the frame upwardly and outwardly with reference to the supporting case 23. In so doing, he releases the latch finger 70 from the opening 77 in the case 23. While the frame is being swung outwardly, a similar swinging action is imparted to the actuating arms 51 and 52 in Figs. 10 and 11, or those shown in the modified arrangements in Figs. 17 to 23 inclusive. Upon such swinging movement of the actuating arms, the slide bars 57 and 58 in Figs. 10 and 11 or the actuator members in Figs. 17 to 23 coact with said arms to effect the reversal of the mirror element in the manner above described.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

We claim:

1. A reversible rear view mirror, comprising a supporting case including a rear wall provided with mounting means therefor and open at the front thereof, a frame hingedly connected to said case, a mirror element normally closing the front of the case and having two oppositely disposed reflective surfaces of different reflecting values, means carried by the mirror element for rotatably supporting the same within said frame, and actuating arms pivotally carried at one end by the case, at least one of said actuating arms having a slot at the other end provided with a gear sector and said supporting means being provided with a gear operating in said slot to effect rotation of the mirror element upon swinging movement of the frame relative to the case to cause said supporting means to reciprocate in said slot and said gear to mesh with said gear sector.

2. A reversible rear view mirror, comprising a supporting case including a rear wall provided with mounting means therefor and open at the front thereof, a frame hingedly connected to said case, a mirror element normally closing the front of the case and having two oppositely disposed reflective surfaces of different reflecting values, means carried by the mirror element for rotatably supporting the same within said frame, and actuating arms pivotally carried at one end by the case and having slots at the other end provided with gear sectors and said supporting means being provided with gears operating in said slots to effect rotation and reversal of the mirror element upon forward and rearward swinging movement of the frame relative to the case to cause said supporting means to reciprocate in said slots and said gears to mesh with said gear sectors.

3. A reversible rear view mirror, comprising a supporting case including a rear wall provided with mounting means therefor and open at the front thereof, a frame hingedly connected to said case, a mirror element normally closing the front of the case and having two oppositely disposed reflective surfaces of different reflecting values, means carried at the opposite ends of the mirror element for rotatably supporting the same within said frame and including actuator members in the form of slide bars with said slide bars at opposite ends of the mirror element being disposed at substantially right angles to one another, and actuating arms pivotally carried by the case and having cam slots receiving the slide bars therein, the actuating arm and slide bar at one end of the mirror coacting to effect partial rotation of the mirror element as the frame is swung outwardly away from the case while the actuating arm and slide bar at the opposite end of the mirror coact to effect further rotation of the mirror element when the frame is swung inwardly toward the case to effect reversal of the mirror element.

4. A reversible rear view mirror, comprising a supporting case including a rear wall provided with mounting means therefor and open at the front thereof, a frame hingedly connected to said case, a mirorr element normally closing the front of the case and having two oppositely disposed reflective surfaces of different reflecting values, means carried at the opposite ends of the mirror element for rotatably supporting the same within said frame and including actuator members in the form of gears, and actuating arms pivotally carried by the case and having slots provided with gear sectors receiving the actuator gears therein, the actuating arm and gear at one end of the mirror coacting to effect partial rotation of the mirror element as the frame is swung outwardly away from the case, while the actuating arm and gear at the opposite end of the mirror coact to effect further rotation of the mirror element when the frame is swung inwardly toward the case to effect reversal of the mirror element.

5. A reversible rear view mirror, comprising a supporting case including a rear wall provided with mounting means therefor and open at the front thereof, a substantially rectangular frame hingedly connected to the upper wall of said case, a mirror element normaly closing the front of the case and having two oppositely disposed reflective surfaces of different reflecting values, means for rotatably supporting the mirror element within said frame, and actuating arms carried at one end by said supporting case and having slots at the other end which receive and operatively engage said mirror element supporting means and coact therewith to effect rotation and reversal of the mirror element when the frame is swung upwardly and downwardly relative to the case.

6. A reversible rear view mirror, comprising a supporting case including a rear wall provided with mounting means therefor and open at the front thereof, a substantially rectangular frame hingedly connected to the upper wall of said case, a mirror element normally closing the front of the case and having two oppositely disposed reflective surfaces of different reflecting values, means carried by the mirror element for rotatably supporting the same within said frame, and actuating arms pivotally carried at one end by said supporting case and having slots at the other end which receive and operatively engage with a portion of said mirror element supporting means for effecting rotation and reversal of the mirror element when the frame is swung upwardly and downwardly relative to the case to cause said mirror element supporting means to reciprocate in said slots in being operatively engaged therewith.

7. A reversible rear view mirror, comprising a supporting case including a rear wall provided with mounting means therefor and open at the front thereof, a substantially rectangular frame hingedly connected to the upper wall of said case, a mirror element normally closing the front of the case and having two oppositely disposed reflective surfaces of different reflecting values, means carried by the mirror element for rotatably supporting the same within said frame, and actuating arms pivotally carried at one end by the case and having slots at the other end which are provided with operative and inoperative areas which receive and operatively engage a portion of the mirror element supporting means and coact therewith to effect rotation and reversal of the mirror element when the frame is swung forwardly and rearwardly relative to the case to cause said portions of the mirror element supporting means to reciprocate in said slots in coacting with said operative and inoperative areas thereof while operatively engaging therewith.

8. A reversible rear view mirror, comprising a supporting case including a rear wall provided with mounting means therefor and open at the front thereof, a substantially rectangular frame hingedly connected to the upper wall of said case, a mirror element normally closing the front of the case and having two oppositely disposed reflective surfaces of different reflecting values, means carried by the mirror element for rotatably supporting the same within said frame, and actuating arms pivotally carried at one end by said case and having slots at the other end which receive and operatively engage with the mirror element supporting means, said supporting means and at least one of said slots coacting with one another to effect rotation and reversal of the mirror element when the frame is swung upwardly and downwardly relative to the case to cause said supporting means to reciprocate in said slots in being operatively engaged therewith.

9. A reversible rear view mirror, comprising a supporting case including a rear wall provided with mounting means therefor and open at the front thereof, a substantially rectangular frame hingedly connected to the upper wall of said case, a mirror element normally closing the front of the case and having two oppositely disposed reflective surfaces of different reflecting values, means carried by the mirror element for rotatably supporting the same within said frame, and actuating arms pivotally carried at one end by the case and having slots at the other end of determinable length and provided with opposed operative and inoperative areas, said supporting means having actuator portions received in and operatively engageable with said slots and coacting with said operative and inoperative areas to effect rotation and reversal of the mirror element upon forward and rearward swinging movement of the frame to cause said actuator portions to reciprocate the entire length of said slots while operatively engaging therewith.

10. A reversible rear view mirror, comprising a supporting case including a rear wall provided with mounting means therefor and open at the front thereof, a frame hingedly connected to said case, a mirror element normally closing the front of the case and having two oppositely disposed reflective surfaces of different reflecting values, means carried by the mirror element for rotatably supporting the same within said frame, and actuating arms pivotally carried at one end by the case and having cam slots at the other end, said supporting means having slide bars operating in said cam slots and coacting therewith to effect rotation and reversal of the mirror element upon forward and rearward swinging movement of the frame to cause said slide bars to reciprocate in said cam slots.

11. A reversible rear view mirror, comprising a supporting case including a rear wall provided with mounting means therefor and open at the front thereof, a substantially rectangular frame hingedly connected to the upper wall of said case, a mirror element normally closing the front of the case and having two oppositely disposed reflective surfaces of different reflecting values, means at the opposite ends of the mirror element for rotatably supporting the same within said frame, an actuating arm carried by the case and having a cam slot receiving and operatively engaging with the supporting means at one end of the mirror element for partially rotating the mirror element when the frame is swung outwardly away from the case, and a second actuating arm carried by the case and having a cam slot receiving and operatively engaging with the supporting means at the opposite end of the mirror element for further rotating the mirror element when the frame is swung inwardly toward the case to effect complete reversal of the mirror element.

12. A reversible rear view mirror, comprising a supporting case including a rear wall provided with mounting means therefor and open at the front thereof, a substantially rectangular frame hingedly connected to the upper wall of said case, a mirror element normally closing the front of the case and having two oppositely disposed reflective surfaces of different reflecting values, means carried at the opposite ends of the mirror element for rotatably supporting the same within said frame, said supporting means including actuator members, and actuating arms pivotally carried by the case and having cam slots receiving and operatively engaging with the actuator members therein, the actuating arm and actuator member at one end of the mirror coacting to effect partial rotation of the mirror element as the frame is swung outwardly away from the case, while the actuating arm and actuator member at the opposite end of the mirror coact to effect further rotation of the mirror element when the frame is swung inwardly toward the case to effect reversal of the mirror element.

13. A reversible rear view mirror, comprising a supporting case including a rear wall provided with mounting means therefor and open at the front thereof, a frame hingedly connected to said case, a mirror element in a position normally closing the front of the case and having two oppositely facing reflective surfaces of different reflecting values, means for rotatably supporting the mirror element within said frame, means for rotating said mirror element, said last named means having one portion thereof moveably mounted on said case and having means on another portion thereof engaging and coacting with said mirror element supporting means to cause said supporting means and mirror element to rotate in said frame when the frame is swung sequentially outwardly and inwardly relative to said case to reverse the position of the reflected surfaces of said mirror element, the said rotating means being moveable with said frame when the frame is swung sequentially outwardly and inwardly.

References Cited in the file of this patent
UNITED STATES PATENTS

| | | |
|---|---|---|
| 1,825,687 | Wilczynski | Oct. 6, 1931 |
| 2,502,699 | Budreck | Apr. 4, 1950 |